(12) United States Patent
Moses et al.

(10) Patent No.: US 8,866,637 B1
(45) Date of Patent: Oct. 21, 2014

(54) DATA COLLECTION PROCESS FOR OPTICAL LEAK DETECTION

(71) Applicant: LDARtools, Inc., Dickinson, TX (US)

(72) Inventors: Kevin Moses, League City, TX (US); Rex Moses, Nassau Bay, TX (US)

(73) Assignee: LDARtools, Inc., Dickinson, TX (US)

( * ) Notice: Subject to any disclaimer, the term of this patent is extended or adjusted under 35 U.S.C. 154(b) by 41 days.

(21) Appl. No.: 13/625,619

(22) Filed: Sep. 24, 2012

Related U.S. Application Data

(63) Continuation of application No. 12/359,196, filed on Jan. 23, 2009, now Pat. No. 8,274,402.

(60) Provisional application No. 61/023,355, filed on Jan. 24, 2008, provisional application No. 61/036,800, filed on Mar. 14, 2008.

(51) Int. Cl.
| | | |
|---|---|---|
| *G08G 1/09* | (2006.01) | |
| *G08B 21/00* | (2006.01) | |
| *H04N 5/33* | (2006.01) | |
| *H04N 9/11* | (2006.01) | |
| *G06K 9/36* | (2006.01) | |
| *G02F 1/01* | (2006.01) | |
| *H01L 25/00* | (2006.01) | |
| *G01N 21/00* | (2006.01) | |

(52) U.S. Cl.
USPC ........... 340/905; 340/605; 348/164; 348/143; 382/280; 250/330; 250/332; 250/338.5

(58) Field of Classification Search
USPC ........... 340/905, 605; 348/164, 143; 382/280
See application file for complete search history.

(56) References Cited

U.S. PATENT DOCUMENTS

| | | | |
|---|---|---|---|
| 3,853,455 | A | 12/1974 | Riordan et al. |
| 3,976,450 | A | 8/1976 | Marcote et al. |
| 3,985,509 | A | 10/1976 | Trone et al. |
| 4,182,740 | A | 1/1980 | Hartmann et al. |
| 4,316,381 | A | 2/1982 | Woodruff |
| 4,346,055 | A | 8/1982 | Murphy et al. |
| 4,603,235 | A | 7/1986 | Crabbe, Jr. |
| H572 | H | 2/1989 | Hansen |
| 5,099,437 | A | 3/1992 | Weber |
| 5,206,818 | A | 4/1993 | Speranza |

(Continued)

FOREIGN PATENT DOCUMENTS

| | | |
|---|---|---|
| EP | 0378674 | 7/1990 |
| EP | 01329725 | 7/2003 |
| WO | 2006022648 | 3/2006 |

OTHER PUBLICATIONS

USPTO Office Action (Mar. 6, 2013)—U.S. Appl. No. 12/463,770 (Moses).

(Continued)

*Primary Examiner* — Jack K Wang
(74) *Attorney, Agent, or Firm* — Pramudji Law Group PLLC; Ari Pramudji

(57) ABSTRACT

Method for collecting video files of one or more Leak Detection and Repair (LDAR) components, including receiving information pertaining to the one or more LDAR components within a specified area, recording a video of the LDAR components for a predetermined amount of time using a camera, associating the video with the information, and storing the video along with the information to a memory located in a computer.

19 Claims, 3 Drawing Sheets

(56) References Cited

U.S. PATENT DOCUMENTS

| | | | |
|---|---|---|---|
| 5,356,594 A | 10/1994 | Neel et al. | |
| 5,432,095 A | 7/1995 | Forsberg | |
| 5,479,359 A | 12/1995 | Rogero et al. | |
| 5,485,620 A | 1/1996 | Sadre et al. | |
| 5,563,335 A | 10/1996 | Howard | |
| 5,655,900 A | 8/1997 | Cacciatore | |
| 5,752,007 A | 5/1998 | Morrison | |
| 5,899,683 A | 5/1999 | Nolte et al. | |
| 6,042,634 A | 3/2000 | Van Tassel et al. | |
| 6,243,657 B1* | 6/2001 | Tuck et al. | 702/150 |
| 6,252,510 B1 | 6/2001 | Dungan | |
| 6,341,287 B1 | 1/2002 | Sziklai et al. | |
| 6,345,234 B1 | 2/2002 | Dilger et al. | |
| 6,438,535 B1 | 8/2002 | Benjamin et al. | |
| 6,478,849 B1 | 11/2002 | Taylor et al. | |
| 6,497,136 B2 | 12/2002 | Satou | |
| 6,545,278 B1 | 4/2003 | Mottier et al. | |
| 6,549,916 B1 | 4/2003 | Sedlar | |
| 6,609,090 B1 | 8/2003 | Hickman et al. | |
| 6,672,129 B1 | 1/2004 | Frederickson et al. | |
| 6,680,778 B2 | 1/2004 | Hinnrichs et al. | |
| 6,722,185 B2 | 4/2004 | Lawson et al. | |
| 6,771,744 B1* | 8/2004 | Smith et al. | 379/67.1 |
| 6,850,161 B1 | 2/2005 | Elliott et al. | |
| 7,017,386 B2 | 3/2006 | Liu et al. | |
| 7,089,530 B1 | 8/2006 | Dardinski et al. | |
| 7,103,610 B2 | 9/2006 | Johnson et al. | |
| 7,136,904 B2 | 11/2006 | Bartek et al. | |
| 7,298,279 B1 | 11/2007 | Badon et al. | |
| 7,330,768 B2 | 2/2008 | Scott et al. | |
| 7,356,703 B2 | 4/2008 | Chebolu et al. | |
| 7,369,945 B2 | 5/2008 | Miller et al. | |
| 7,437,362 B1 | 10/2008 | Ben-Natan | |
| 7,482,973 B2 | 1/2009 | Tucker et al. | |
| 7,568,909 B2 | 8/2009 | MacNutt et al. | |
| 7,588,726 B1 | 9/2009 | Mouradian et al. | |
| 7,657,384 B1 | 2/2010 | Moses | |
| 7,721,529 B2 | 5/2010 | Kesse et al. | |
| 7,840,366 B1 | 11/2010 | Moses et al. | |
| 7,851,758 B1 | 12/2010 | Scanlon et al. | |
| 7,908,118 B2 | 3/2011 | Trowbridge et al. | |
| 8,034,290 B1 | 10/2011 | Skiba et al. | |
| 8,193,496 B2 | 6/2012 | Furry | |
| 2002/0026339 A1 | 2/2002 | Frankland et al. | |
| 2002/0059463 A1 | 5/2002 | Goldstein | |
| 2002/0080032 A1 | 6/2002 | Smith et al. | |
| 2002/0092974 A1 | 7/2002 | Kouznetsov | |
| 2002/0094498 A1 | 7/2002 | Rodriguez-Rodriguez et al. | |
| 2002/0178789 A1 | 12/2002 | Sunshine et al. | |
| 2003/0012696 A1 | 1/2003 | Millancourt | |
| 2003/0062997 A1* | 4/2003 | Naidoo et al. | 340/531 |
| 2003/0081214 A1 | 5/2003 | Mestha et al. | |
| 2003/0085714 A1 | 5/2003 | Keyes et al. | |
| 2003/0217101 A1 | 11/2003 | Sinn | |
| 2004/0005715 A1 | 1/2004 | Schabron et al. | |
| 2004/0011421 A1 | 1/2004 | Bartlett et al. | |
| 2004/0059539 A1 | 3/2004 | Otsuki et al. | |
| 2004/0177032 A1 | 9/2004 | Bradley et al. | |
| 2004/0204915 A1 | 10/2004 | Steinthal et al. | |
| 2004/0226345 A1 | 11/2004 | McCoy et al. | |
| 2004/0258213 A1 | 12/2004 | Beamon et al. | |
| 2005/0000981 A1 | 1/2005 | Peng et al. | |
| 2005/0005167 A1 | 1/2005 | Kelly et al. | |
| 2005/0053104 A1 | 3/2005 | Kulp et al. | |
| 2005/0060392 A1 | 3/2005 | Goring et al. | |
| 2005/0117641 A1 | 6/2005 | Xu et al. | |
| 2005/0181245 A1 | 8/2005 | Bonne et al. | |
| 2005/0234934 A1 | 10/2005 | Mackay et al. | |
| 2005/0243765 A1 | 11/2005 | Schrader et al. | |
| 2005/0246112 A1 | 11/2005 | Abhulimen et al. | |
| 2005/0262995 A1 | 12/2005 | Kilkis | |
| 2005/0267642 A1 | 12/2005 | Whiffen et al. | |
| 2005/0275556 A1 | 12/2005 | Brown | |
| 2005/0286927 A1 | 12/2005 | Brenner | |
| 2006/0020186 A1 | 1/2006 | Brister et al. | |
| 2006/0220888 A1* | 10/2006 | Germouni et al. | 340/605 |
| 2006/0235611 A1 | 10/2006 | Deaton et al. | |
| 2006/0246592 A1 | 11/2006 | Hashmonay | |
| 2006/0286495 A1 | 12/2006 | Roussel | |
| 2007/0000310 A1 | 1/2007 | Yamartino et al. | |
| 2007/0004381 A1 | 1/2007 | Larson et al. | |
| 2007/0074035 A1 | 3/2007 | Scanlon et al. | |
| 2007/0136190 A1 | 6/2007 | Engle | |
| 2007/0139183 A1 | 6/2007 | Kates | |
| 2007/0299953 A1 | 12/2007 | Walker et al. | |
| 2008/0021717 A1 | 1/2008 | Kaartinen et al. | |
| 2008/0063298 A1* | 3/2008 | Zhou et al. | 382/280 |
| 2008/0092625 A1 | 4/2008 | Hinnrichs | |
| 2008/0120043 A1 | 5/2008 | Miller et al. | |
| 2008/0229805 A1 | 9/2008 | Barket et al. | |
| 2008/0231719 A1* | 9/2008 | Benson et al. | 348/222.1 |
| 2009/0212960 A1 | 8/2009 | Rolff et al. | |
| 2009/0315669 A1 | 12/2009 | Lang et al. | |
| 2010/0211333 A1 | 8/2010 | Pruet et al. | |

OTHER PUBLICATIONS

"2nd Annual Fugitive Emissions—Leak Detection and Repair Symposium"; ISA Technical Conference Brochure; Nov. 2002.

"Introducing the Allegro CX(TM) Field Computer"; Product Newswire (product announcement); Jun. 21, 2004.

"New from Accutech, Wireless Acoustic Monitor Field Units Make Fugitive Emissions Monitoring Compliance Easy"; Product Announcement/Description; Feb. 10, 2004.

*Environmental Analytics, Inc.* v. *TMX2, Inc. and LDAR Solutions, Ltd.*; Case 4:08-cv-03353; USDC, Southern District of Texas; First Amended Complaint; Dec. 10, 2008.

"LDARManager™ Makes Fugitive Emission Monitoring a Breeze TISCOR launches its newest product for Leak Detection and Repair"; product announcement/description; Nov. 8, 2002.

Office Action (Aug. 4, 2009); U.S. Appl. No. 12/032,499 (Moses, et al).

Response to Office Action (Jul. 13, 2010); Office Action (Apr. 14, 2010);Response/Amendment After Final (Mar. 29, 2010); Final Office Action (Jan. 29, 2010); Response to Office Action (Nov. 4, 2009); and Office Action (Aug. 4, 2009); U.S. Appl. No. 12/032,499 (Moses, et al).

Response to Office Action (Feb. 22, 2012) and USPTO Office Action (Nov. 22, 2011); U.S. Appl. No. 12/463,770 (Moses).

Response/Amendment After Final (Aug. 24, 2010); Final Office Action (Jun. 25, 2010);Response to Office Action (Apr. 26, 2010); and Office Action (Jan. 25, 2010); U.S. Appl. No. 11/668,367 (Skiba, et al).

USPTO Final Action (Jul. 12, 2012) and Response to Office Action (Apr. 24, 2012); U.S. Appl. No. 12/814,265 (Moses).

USPTO Office Action (Jan. 24, 2012)—U.S. Appl. No. 12/814,265 (Moses).

Response to Office Action (Feb. 21, 2012) and USPTO Office Action (Nov. 18, 2011); U.S. Appl. No. 12/359,196 (Moses, et al.).

USPTO Allowance (Jun. 8, 2011); U.S. Appl. No. 11/668,367 (Skiba, et al).

RCE Amendment (Jun. 22, 2011) and USPTO Advisory Action (Jun. 7, 2011); U.S. Appl. No. 12/133,920 (Moses et al).

Response to Office Action (Aug. 29, 2011), USPTO Office Action (May 27, 2011); U.S. Appl. No. 12/474,504 (Bolinger et al).

"Bluetooth Tutorial—Specifications"; Palo Wireless: Bluetooth Resource Center [online]; Jan. 5, 2006; retrieved Dec. 23, 2009 via Internet Archive Wayback Machine.

Response After Final (May 23, 2011), Final Office Action (Mar. 22, 2011), Response to Office Action (Dec. 27, 2010); U.S. Appl. No. 12/133,920 (Moses et al).

Response to Office Action (Mar. 21, 2011), Office Action (Dec. 21, 2010), RCE (Sep. 27, 2010), Advisory Action (Sep. 10, 2010); U.S. Appl. No. 11/668,367 (Skiba et al).

USPTO Office Action (Mar. 6, 2013)—U.S. Appl. No. 12/463,770 (Moses, et al.).

USPTO Notice of Allowance (May 3, 2012); U.S. Appl. No. 12/474,504 (Bolinger et al.).

(56) References Cited

OTHER PUBLICATIONS

Sylvers, Eric ; Wireless: The story of 'Wi'-Technology-International Herald Tribune; Apr. 2006; http://www.nytimes.com/2006/04/17/technology/17iht-wireless18.1550306.html?pagewanted=print (retrieved May 17, 2011).

USPTO Office Action (Nov. 22, 2011); U.S. Appl. No. 12/463,770 (Moses).

RCE Amendment (Jun. 22, 2011) and USPTO Advisory Action (Jun. 7, 2011); U.S. Appl. No. 12/133,920 (Moses, et al).

Method 21—Determination of Volatile Organic Compound Leaks; EPA; 1983.

TVA-1000B—Toxic Vapor Analyzer; Instruction Manual (P/N BK3500); Thermo Environmental Instruments Inc.; 2001.

Corrected Petition by Inspection LogicCorporation for Inter Partes Review of US Patent No. 7,657,384; IPR2014-01044; filed Jul. 11, 2014.

Declaration of Chris Patterson in Support of Petition by Inspection LogicCorporation for Inter Partes Review of US Patent No. 7,657,384; IPR2014-01044; dated Jun. 25, 2014.

Declaration of Donald D. Bradley III, P.E. In Support of Petition by Inspection LogicCorporation for Inter Partes Review of US Patent No. 7,657,384; IPR2014-01044; dated Jun. 23, 2014.

Environmental Science Deskbook; Thompson Reuters; pp. 8-24 through 8-24.8; 2013.

LeakTracker MARS User Guide, Version 2.1; Pursuit Global Solutions; Mar. 2000.

California Implementation Guidelines for Estimating Mass Emissions of Fugitive Hydrocarbon Leaks at Petroleum Facilities; California Air Pollution Control Officers Association (CAPCOA); Feb. 1999.

Dictionary definition for "display"; Webster's II New Riverside University Dictionary; p. 388; 1988.

Petition by Inspection LogicCorporation for Inter Partes Review of US Patent No. 8,386,164; IPR2014-01008; filed Jun. 20, 2014.

Declaration of Donald D. Bradley III, P.E. in Support of Petition by Inspection LogicCorporation for Inter Partes Review of US Patent No. 8,386,164; IPR2014-01008; dated Jun. 20, 2014.

Curriculum Vitae of Donald D. Bradley III, P.E.; Mar. 31, 2014.

Dictionary definition for "representation"; The American Heritage Dictionary of the English Language; p. 1480; 4th Edition; 2000.

Dictionary definition for "representation"; Webster's Ninth New Collegiate Dictionary; p. 1000; 1987.

Plaintiff's and Counter-Defendant's Initial Disclosures; Case 3:14-cv-00012; *LDARtools, Inc.* v. *InspectionLogic Corporation* v. *Rex Moses*; United States District Court, Southern District of Texas, Galveston Division; Jun. 5, 2014.

LDARtools—Guideware Settlement Agreement; May 14, 2014.

Defendant's / Counterclaimant's Initial Disclosures; Case 3:14-cv-00012; *LDARtools, Inc.* v. *InspectionLogic Corporation* v. *Rex Moses*; United States District Court, Southern District of Texas, Galveston Division; Jun. 5, 2014.

Answer and Counterclaim; Case 3:14-cv-00012; *LDARtools, Inc.* v. *InspectionLogic Corporation* v. *Rex Moses*; United States District Court, Southern District of Texas, Galveston Division; Mar. 27, 2014.

\* cited by examiner

DATA COLLECTION PROCESS FOR OPTICAL LEAK DETECTION

RELATED APPLICATIONS

This application is a continuation of U.S. patent application Ser. No. 12/359,196, filed Jan. 23, 2009, titled DATA COLLECTION PROCESS FOR OPTICAL LEAK DETECTION, which claims priority to and the benefit of (1) U.S. provisional patent application Ser. No. 61/023,355, filed Jan. 24, 2008, titled DATA COLLECTION PROCESS FOR OPTICAL LEAK DETECTION and (2) U.S. provisional patent application Ser. No. 61/036,800, filed Mar. 14, 2008, titled DATA COLLECTION PROCESS FOR OPTICAL LEAK DETECTION. Each of the aforementioned related patent applications is herein incorporated by reference.

BACKGROUND

1. Field of the Invention

Implementations of various technologies described herein generally relate to various methods and/or systems for developing and maintaining data management systems.

2. Description of the Related Art

The following descriptions and examples do not constitute an admission as prior art by virtue of their inclusion within this section.

Developing and implementing accurate and reliable database systems for applications entailing a large volume of data detail and many variations in component/inventory structures is not an easy or obvious undertaking. Since the advent of data management, a key component of a successful program has been the quality and condition of the database. For the earliest pioneers this was as straightforward as maintaining a set of 3×5 cards on which a series of data entries were recorded. On a periodic basis, the cards where sorted and data was updated or transferred to other media as desired.

One industry where the quality of the database impacts key aspects of operations is in the field of Leak Detection and Repair (LDAR). In this field, videos are used to determine if components such as valves, pumps, compressors, connectors, flanges, and other devices are leaking. The videos are stored in a computer readable medium as video files. Building and maintaining an effective database of these files can often be daunting. Developing an LDAR video file inventory and associated database is a difficult process that involves effective management of video file names, time and date information for each video file, intricate process conditions, and other relevant information. These projects are typically done on a rush basis with both impending deadlines and tight budgets. The difficulty is compounded by the fact that the current technology available for cataloguing video files is extremely convoluted and tedious.

SUMMARY

Described herein are implementations of various technologies for implementing and maintaining accurate and reliable data management/tracking systems for leak detection video files in a leak detection video data system. In one implementation, the leak detection video data system may include one or more Leak Detection and Repair (LDAR) components, a camera, a computer, and an adapter cable. The computer and camera may communicate with each other via the adapter cable such that the computer may be used to control the camera. In one implementation, the camera may be capable of recording videos of the LDAR components, while the computer may encode and store the videos on a database.

In another implementation, a computer application stored on the computer may receive information describing the LDAR components within an area from a technician. After receiving the relevant information, the computer application may use the camera to record a video of the LDAR components for a predetermined amount of time. After recording the video, the computer application may associate the recorded video with the information pertaining to the components in the video. The computer application may then store the recorded video along with its associated information in a database or a memory device on the computer. In another implementation, the technician may use the computer application to superimpose information pertaining to the LDAR components onto the video while the video is being recorded by the camera.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
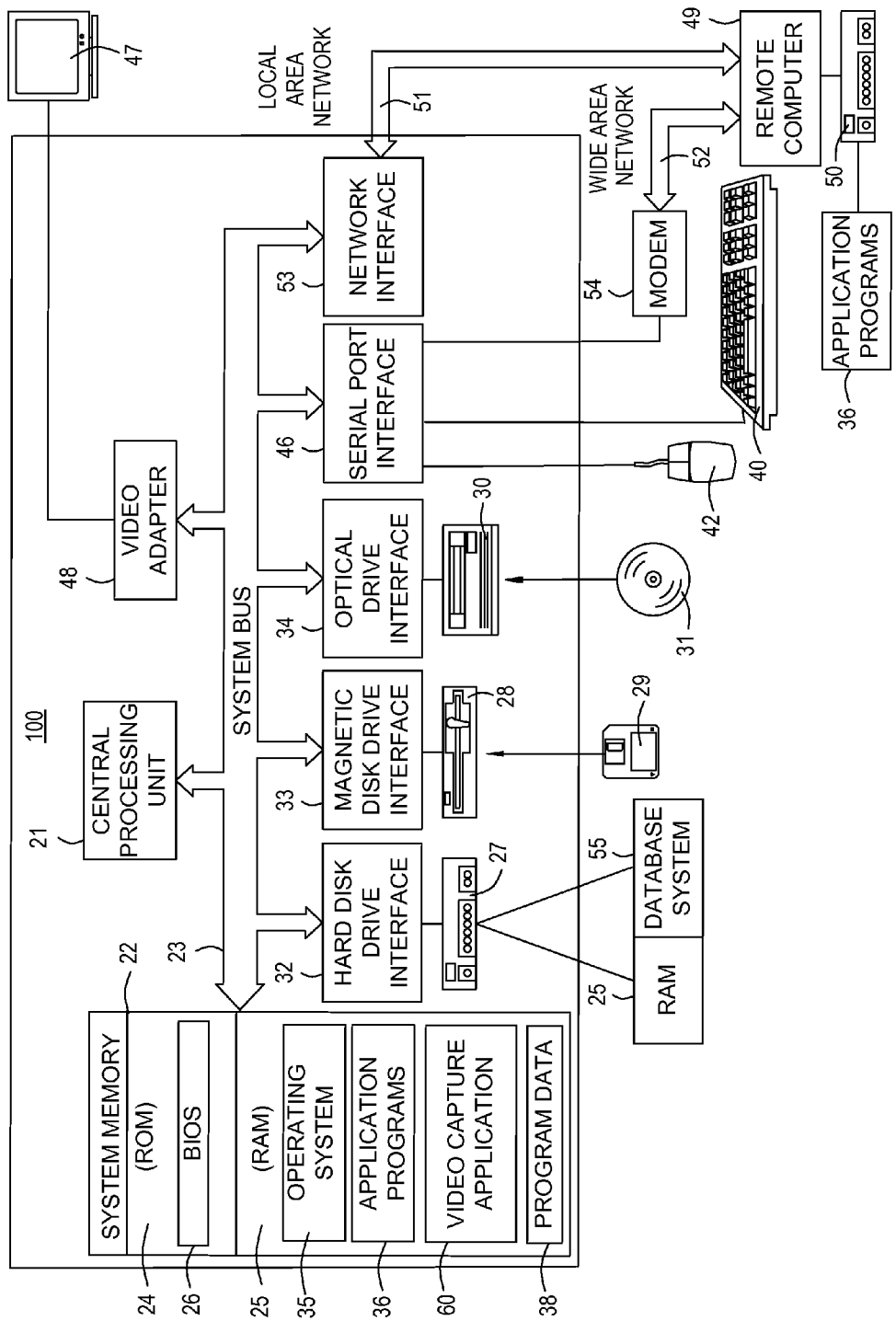
FIG. 1 illustrates a schematic diagram of a personal computer (PC) in accordance with one or more implementations of various technologies and techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief executive summary of one or more implementations of various techniques directed to implementing and maintaining accurate and reliable data management/tracking systems for leak detection video files. In one implementation, the leak detection video data system may include an LDAR database, a laptop, an adapter cable, an optical leak detection camera, a technician, an area, an area tag, and one or more components to be monitored.

In operation, a technician may use an application stored on the laptop or other computing system to download an LDAR "route" from the LDAR database. The LDAR route may include a list of areas such that each area may contain one or more LDAR components within a close proximity of each other. After receiving the LDAR route, the technician may travel to the first area listed in the route and set up an optical leak detection camera to record a video at the site such that all of the components of the area may be seen on the display of the camera. In one implementation, the technician may use an image file to determine how to set up the optical leak detection camera with respect to the components in the area. The image file may include an image or photograph of the components in the area that the technician may be recording a video. In one implementation, the technician may position the display of the optical leak detection camera in such a manner that it may closely match that of the image. The technician may then connect the optical leak detection camera to the laptop with an adapter cable or with a wireless adapter. After the laptop is connected to the optical leak detection camera, the technician may use a computer application to view the camera's image from the laptop's video display. Here, the technician may enter information about the area such as its location, time, date, temperature, and the like into corresponding information fields that may be listed on the application. This information may be superimposed on the video itself or stored as an attachment that references the video file or in an identification tag contained within the video file. The technician may then use a computer application to record the optical leak detection camera's image for a specified amount of time.

After the computer application records the optical leak detection camera's image for the specified amount of time, it may encode and store the recorded images as a video file on a hard drive or another memory device located on the laptop. The computer application may automatically store the video file with a unique file name so that the newly created video file may not overwrite any preexisting video files.

Upon viewing the video with the application, the technician may determine that a component in the area is leaking. If the component is leaking, the technician may zoom into the image of the leaking component with the optical leak detection camera to record an "up-close" image of the leaking component. The technician may then view the optical leak detection camera's output image on the laptop's video display and may enter additional information pertaining to the leaking component, such as the component type, time, date of the video, temperature at the site, and the like, on additional information fields provided on the computer application. The technician may then send a command to the computer application to record the "up-close" image for a specified number of seconds.

After the computer application records the leaking component's image up close for the specified amount of time, it may encode and store the video file on its hard drive or another memory device. The video file may again be stored under a unique file name along with the information about the leaking component.

After recording videos of all of the leaking components in an area, the computer application may either direct the technician to proceed to the next area listed in the downloaded route or inform the technician that he has completed recording the assigned areas according to his route.

One or more implementations of various techniques for managing a leak detection video data system will now be described in more detail with reference to FIGS. 1-3 in the following paragraphs.

FIG. 1 illustrates a schematic diagram of a computing system 100 in which the various technologies described herein may be incorporated and practiced. As mentioned above, in one implementation, the computing system 100 may be a laptop used by the technician in the field.

The computing system 100 may include a central processing unit (CPU) 21, a system memory 22 and a system bus 23 that couples various system components including the system memory 22 to the CPU 21. Although only one CPU is illustrated in FIG. 1, it should be understood that in some implementations the computing system 100 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24.

The computing system 100 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100.

Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 27, magnetic disk 29, optical disk 31, ROM 24 or RAM 25, including an operating system 35, one or more application programs 36, a video capture application 60, program data 38, and a database system 55. The operating system 35 may be any suitable operating system that may control the operation of a networked personal or server computer, such as Windows® XP, Mac OS® X, Unix-variants (e.g., Linux® and BSD®), and the like. The video capture application 60 may be software capable of recording the images received from an optical leak detection camera and storing the recording in a video file. The video capture application 60 will be described in more detail with reference to FIG. 3 in the paragraphs below.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. The monitor 47 may be of a touch screen monitor such that it may display the output of the computing system 100, and it may also be able to detect the presence and location of a touch for inputs into the computing system. In addition to the monitor 47, the computing system 100 may further include other peripheral output devices such as speakers and printers.

Further, the computing system 100 may operate in a networked environment using logical connections to one or more remote computers 49. The logical connections may be any connection that is commonplace in offices, enterprise-wide computer networks, intranets, and the Internet, such as local area network (LAN) 51 and a wide area network (WAN) 52.

When using a LAN networking environment, the computing system 100 may be connected to the local network 51 through a network interface or adapter 53. When used in a WAN networking environment, the computing system 100 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
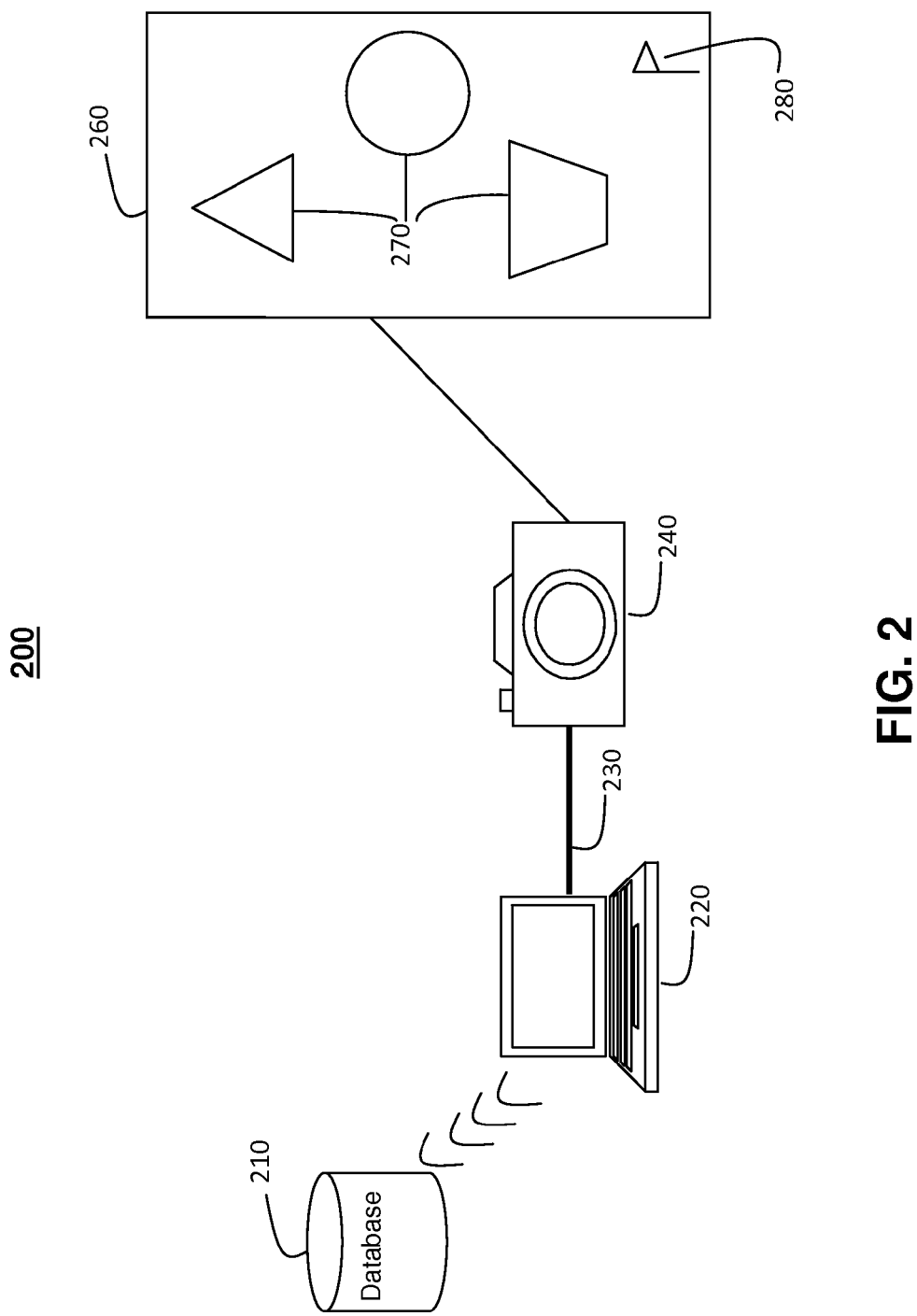
FIG. 2 illustrates a schematic diagram of the optical leak detection data collection system in accordance with one or more implementations of various technologies and techniques described herein.

FIG. 2 illustrates a schematic diagram of a system or network 200 that may be used to develop and maintain a database containing information pertaining to leak detection video files in accordance with one or more implementations of various technologies and techniques described herein.

The system 200 may include a computer device, such as a laptop 220 in communication with a database 210, an optical leak detection camera 240 (camera 240), an adapter cable 230, an area 260, an area tag 280, and one or more components 270.

The database 210 may be configured to store LDAR information, such as a technician's route, area names, component types, and the like. The database 210 may also contain an index of the available video files in the database. The database 210 may be located on a server, personal computer, or other similar computer medium that may be accessed by the laptop 220. Alternatively, the database 210 may also be stored in the laptop 220.

The laptop 220 may be a computer medium with the attributes of the computing system 100 as described in FIG. 1. Although various implementations described herein are with reference to a laptop, it should be understood that in some implementations the laptop 220 may be substituted with any other computer device that can utilize software programs, communicate wirelessly with other computer media, and interface with the camera 240 through a adapter cable 230, such as a desktop, Pocket PC, Personal Digital Assistant (PDA), and the like. In one implementation, the laptop 220 may be part of the camera 240. As such, the camera 240 may include the attributes of the computing system 100 and the ability to detect leaks from components 270.

The adapter cable 230 may convert images obtained from the camera 240 into a digital format that may be received by the laptop 220. In one implementation, the adapter cable 230 may interface with the laptop 220 via a Universal Serial Bus (USB) connection. The camera 240 may be any camera that may be used to determine if components may have a gas or liquid leak. In one implementation, the camera 240 may be an infrared camera that may determine if a component is leaking with the use of infrared light and the like. Although the adapter cable 230 may have been described to be connected to the USB connection of the laptop 220, it should be understood that in other implementations the adapter cable 230 may connect to another input medium of the laptop 220. Furthermore, in some implementations, the camera 240 may be connected to the laptop 220 via a wireless connection or a wireless network.

The area 260 may include images for the components 270 that may be located within a close proximity of each other. The components 270 may include equipment such as valves, pumps, compressors, connectors, flanges, and other similar devices. The area 260 may be marked by the area tag 280, which may indicate the components 270 that are within the area 260 and information pertaining to its components 270, such as its type, size, location, and the like. The area tag 280 may be placed in close proximity to the components 270 of the area 260. In one implementation, the area 260 and the area tag 280 may be referred to as an image group and image group tag, respectively.

Figure 3:
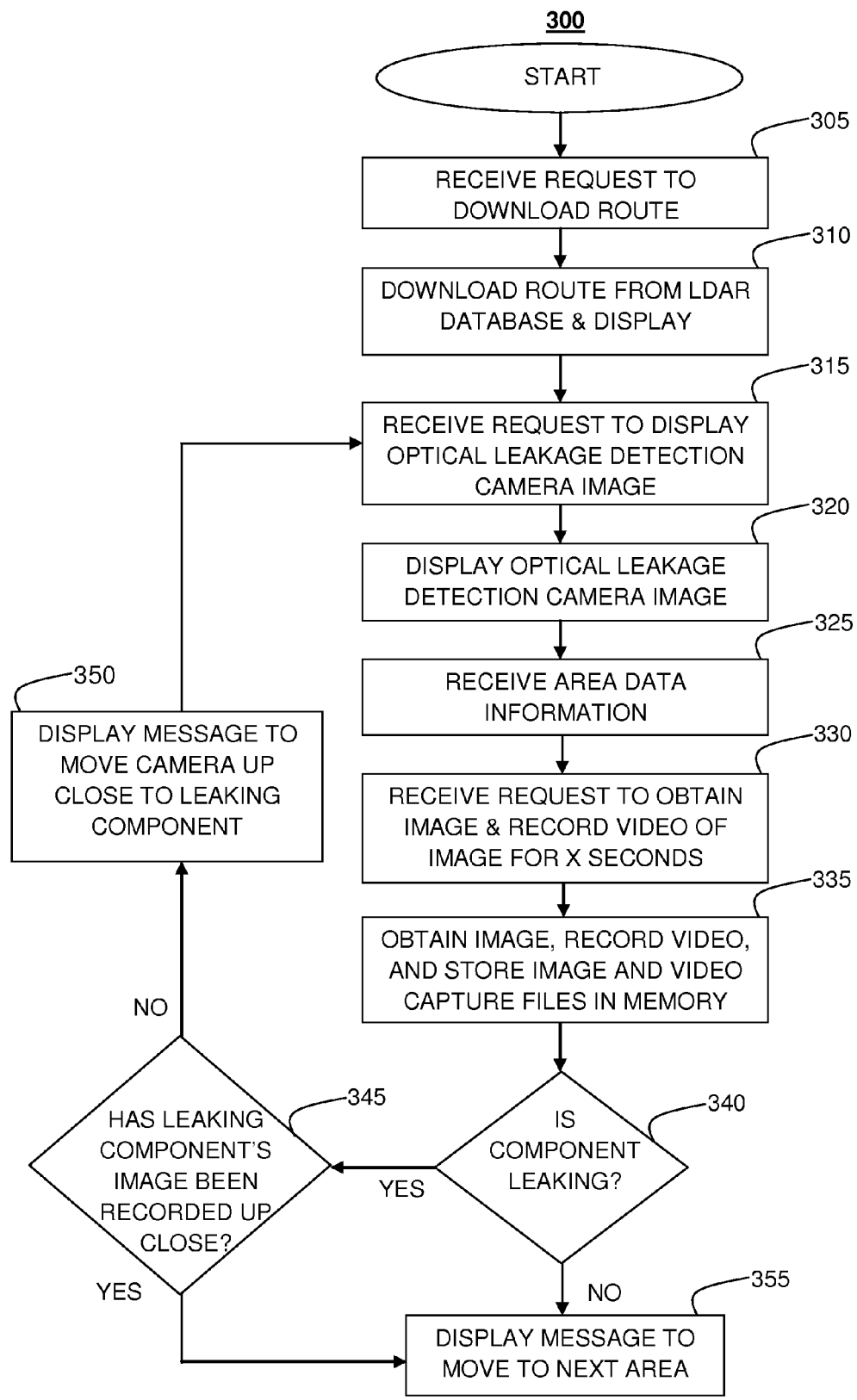
FIG. 3 illustrates a flow diagram of a method for collecting and managing data of optical leak detection video files in accordance with one or more implementations of various techniques described herein.

FIG. 3 illustrates a flow diagram of a method 300 for collecting and managing data of optical leak detection video files in accordance with one or more implementations of various techniques described herein. It should be understood that while the flow diagram of the method 300 indicates a particular order of execution of the operations, in some implementations, certain portions of the operations might be executed in a different order. In one implementation, the process for collecting and managing data of optical leak detection video files may be performed by the video capture application 60.

At step 305, the video capture application 60 may receive a request from a technician to download the LDAR route from the database 210. The route may include a list of one or more areas 260 containing components 270 that the technician may be assigned to monitor during a shift.

At step 310, the video capture application 60 may download the route from the database 210. The video capture application 60 may use the LAN 51 or WAN 52 to establish a connection with the database 210 to download the route. Upon downloading the route, the video capture application 60 may display the route on the monitor 47 via a Graphical User Interface (GUI) window. In one implementation, the route may include a list of the areas 260 where each area 260 includes one or more components 270 placed within a close proximity of each other. In one implementation, each area 260 may be associated with a corresponding area image and video file that may contain a previously obtained image and optical leak detection video of the components 270 in the area 260. The route may be presented on one GUI window on the monitor 47 of the computing system 100.

In one implementation, the technician may select an area 260 from the GUI window displaying the route to view a list of the components 270 in a particular area 260. If the GUI window of the particular area 260 does not accurately reflect the actual components 270 that may be in the particular area 260, the technician may edit the GUI window of the particular area 260 so that it may accurately represent the components 270 in the area 260. In one implementation, the technician may drag one or more icons that may represent the components 270 from a GUI window containing icons that may represent every possible component 270 to the GUI window representing the particular area 260. Although it has been described that the video capture application 60 may display the route information in various GUI windows, it should be understood that the route information may be displayed on the monitor 47 in a variety of other ways such as GUI columns, text lists, and the like.

The technician may then travel to the location of the first area 260 listed in the route. Here, the technician may set up the camera 240 such that it may monitor the components 270 in the area 260. In one implementation, if the area 260 is not associated with a previously recorded video file, the technician may set up the camera so that all of the components 270 in the area 260 are visible through the camera's lenses. As such, the camera 240 may be set up to where the components 270 are readily identifiable in the display of the camera 240 and where the components 270 are located within a predetermined distance away from the camera 240. The predetermined distance may be defined by one or more regulations related to obtaining videos of LDAR components. The technician may then connect the camera 240 to the laptop 220 using the cable adapter 230.

In one implementation, the video capture application 60 may display the route as a list of icons in a GUI window. Each icon may represent an area 260 that the technician may need to check for leaking components. Each icon representing an area 260 may also be represented by a second GUI window. The second GUI window may contain one or more other icons which may represent the components 270 that may be in the area 260. In one implementation, the technician may edit the components 270 listed in each GUI window representing an area 260 to accurately represent information pertaining to the components 270 that may physically exist in each area 260. For example, if the GUI window representing a particular area 260 does not accurately indicate the components 270 that may actually exist within the area 260, the technician may add or subtract one or more components 270 into the GUI window representing the particular area 260 to accurately reflect each component 270 that may be in the area 260. In one implementation, the technician may drag and drop specific icon may represent each type of the components 270. Here, the technician may then drag the appropriate icon representing a specific type of component 270 from the GUI window containing the list of icons representing each type of component 270 to the GUI window representing the area 260 containing the respective component 270.

If, however, the area 260 is associated with a previously recorded video file, the technician may first locate and view an image file that may correspond to the previously recorded video file. In one implementation, the image file may be stored on the database 210 along with the video files. The image file may include a photograph that displays the components 270 in the area 260 as it was previously recorded by the camera 240. In one implementation, the image file may be viewed on the monitor 47 of the laptop 220 or on the view finder of the camera 240. The image file may be used by the technician as a reference point or a guide to properly obtain the video of the components 270. As such, the technician may use the image file to determine an appropriate position to set up the camera 240 to record the video of the components 270 in the area 260.

In one implementation, the technician may set up the camera 240 such that its view finder may display the components 270 of the area 260 in a substantially similar manner as compared to the corresponding image file. For example, the technician may align what he sees in the view finder or display of the camera 240 with the corresponding image file before he obtains an image or video file. In another implementation, the image file may be used as an audit tool by enabling an auditor to quickly compare the images obtained by a technician and the corresponding image files of the area 260. The image file may, therefore, assist the technician in determining whether the components 270 in the area 260 are properly displayed on the camera 240 and whether the camera 240 is positioned at an appropriate distance away from the components 270. For example, an auditor may compare the images obtained by the technician and the corresponding image files to determine if the two images were obtained by the camera 240 from the same or geographical location. In one implementation, the location in which the camera is set up may be referred to as a view spot. Although in this implementation the image file has been described to have been located and viewed on the laptop 220 or the camera 240, it should be noted that in other implementations the image file may be printed on photograph paper or the like.

At step 315, the video capture application 60 may receive a request from the technician to display the image obtained from the camera 240 on the laptop 220. In one implementation, such request may take place when the technician presses the "ENTER" key on the keyboard 40.

At step 320, the video capture application 60 may display the image obtained from the camera 240 on the monitor 47. In one implementation, the video capture application 60 may display the image on another GUI window on the monitor 47. The resolution of the image may be displayed in a variety of different resolutions, such as 640×480 pixels and the like.

At step 325, the video capture application 60 may receive information pertaining to the area 260, such as temperature, date, time, component types, area name, location, and the like. In one implementation, information pertaining to the area 260 may be superimposed onto the images as they are being displayed on the video.

The technician may then document the name of each component 270 being monitored in the area 260 on the area tag 280. The technician may hang the area tag 280 such that it may be located in close proximity of the components 270 of the area 260. In one implementation, the technician may place the area tag 280 such that each component 270 in the area 260 and the area tag 280 may be visible on the camera 240.

At step 330, the video capture application 60 may receive a request to obtain an image from the camera 240 and record the image for a predetermined amount of time.

At step 335, after receiving the request to record the camera's image, the video capture application 60 may obtain an image of the camera 240 and record the camera's image for the predetermined amount of time. In one implementation, the image of the camera 240 may be stored as an image file into the hard disk drive 27 or another memory component in the laptop 220 or the camera 240. The image file may be given a distinct name to associate the file with the corresponding area 260 that it represents. The obtained image may be an infrared light, visible light, or any other similar type of image such that the components 270 in the area 260 are readily identifiable by a technician. The obtained image may be used by a technician to confirm that all of the components have been included in the video. Although the image is described above as being obtained prior to recording the video, it should be understood that this image may be obtained after or during the video recording.

Additionally, while the video capture application 60 is actively recording a video of the camera's image, the technician may superimpose information fields, visible light photographs, or other items onto the video in real time. Upon completing the video recording, the video capture application 60 may automatically encode and store the video file into the hard disk drive 27 or another memory component. The video capture application 60 may encode or compress the video file in one or more codecs. The technician may select one or more codecs in which to store the video file. In one implementation, the video capture application 60 may generate a unique file name for each video file such that the newly created file may not overwrite another video file. The file names for the video files may include technician defined files, sorting, searching, and archiving features.

In one implementation, after the video capture application 60 records the camera's image for the predetermined amount of time, it may display a message on the monitor 47 to move camera 240 so that a different viewing angle of the area 260 may be recorded.

At step 340, the video capture application 60 may request the technician to indicate if one of the components 270 is leaking. In one implementation, the camera 240 may automatically indicate to the video capture application 60 that one of the components is leaking.

If the video capture application 60 receives an indication from the technician that the components 270 were not leaking, the video capture application 60 may proceed to step 355. At step 355, the video application 60 may display a message on the monitor 47 instructing the technician to proceed to the next area 260 listed in the route.

Referring back to step 340, if the technician indicates that a component is leaking, the video capture application 60 may proceed to step 345 and request that the technician indicate if the leaking component's image has been recorded up close.

If the technician indicates to the video capture application 60 that the leaking component's image has not been recorded up close, the video capture application 60 may proceed to step 350 and display a message for the technician to zoom into the image of the leaking component found at step 340. After the technician has zoomed into the image of the leaking component, the video capture application 60 may repeat steps 315-335 for the leaking component.

Referring back to step 345, if the video capture application 60 receives input from the technician indicating that the leaking component's image was already recorded up close, then the video capture application 60 may proceed to step 350 and display a message on the monitor 47 instructing the technician to proceed to the next area listed in his route.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A non-transitory computer-readable medium having stored thereon computer-executable instructions which, when executed by a computer, cause the computer to:
   receive a route of specified areas to be monitored for a gas or liquid leak, wherein each specified area includes one or more Leak Detection and Repair (LDAR) components;
   receive a video of at least one specified area in the route;
   display the video of the at least one specified area on the computer; and
   display the LDAR components as one or more icons in a Graphical User Interface (GUI) window.

2. The non-transitory computer-readable medium of claim 1, further comprising computer-executable instructions which, when executed by the computer, cause the computer to:
   associate the video of the at least one specified area in the route with information corresponding to the LDAR components in the at least one specified area in the route; and
   store the video of the at least one specified area in the route with the information corresponding to the LDAR components to a memory or a hard drive in the computer.

3. The non-transitory computer-readable medium of claim 1, further comprising computer-executable instructions which, when executed by the computer, cause the computer to receive a modification to the LDAR components in the route.

4. The non-transitory computer-readable medium of claim 3, wherein the modification comprises a removal or an addition of one or more LDAR components in the route.

5. The non-transitory computer-readable medium of claim 1, further comprising computer-executable instructions that cause the computer to display at least one specified area in the route as an icon in a Graphical User Interface (GUI) window.

6. The non-transitory computer-readable medium of claim 1, wherein the video is a video of all of the LDAR components in the at least one specified area in the route.

7. The non-transitory computer-readable medium of claim 1, further comprising computer-executable instructions which, when executed by the computer, cause the computer to:
receive an indication from a user that one of the LDAR components is leaking;
prompt the user to obtain a closer video of the one of the LDAR components that is leaking;
record the closer video of the one of the LDAR components that is leaking; and
store the closer video to the memory located in the computer.

8. The non-transitory computer-readable medium of claim 2, wherein the information corresponding to the LDAR components in the at least one specified area in the route comprises temperature, date, time, LDAR component types, name of the LDAR components or the specified area, or combinations thereof.

9. A non-transitory computer-readable medium having stored thereon computer-executable instructions which, when executed by a computer, cause the computer to:
receive a route of specified areas to be monitored for a gas or liquid leak, wherein each specified area includes one or more Leak Detection and Repair (LDAR) components;
receive a video of at least one specified area in the route;
display the video of the at least one specified area on the computer; and
superimpose information corresponding to the LDAR components within the at least one specified area in the route, a photograph, or combinations thereof onto the video.

10. A non-transitory computer-readable medium having stored thereon computer-executable instructions which, when executed by a computer, cause the computer to:
receive a route of specified areas to be monitored for a gas or liquid leak, wherein each specified area includes one or more Leak Detection and Repair (LDAR) components;
receive a video of at least one specified area in the route;
display the video of the at least one specified area on the computer; and
prompt a user to record another video of the LDAR components within the at least one of the specified areas at a different viewing angle.

11. A non-transitory computer-readable medium having stored thereon computer-executable instructions which, when executed by a computer, cause the computer to:
receive a route of specified areas, wherein each specified area includes one or more Leak Detection and Repair (LDAR) components;
receive one or more images associated with monitoring for a gas or liquid leak in at least one specified area in the route;
display the images on the computer;
display the at least one specified area in the route as an icon in a Graphical User Interface (GUI) window;
receive an indication based on the displayed images of whether at least one of the LDAR components within the at least one specified area is leaking; and
if the indication indicates that at least one of the LDAR components within the at least one specified area is not leaking, display a message on the computer for a user to proceed to another specified area in the route.

12. The non-transitory computer-readable medium of claim 11, wherein the images comprise a video of LDAR components in all specified areas in the route.

13. The non-transitory computer-readable medium of claim 11, wherein the indication indicates that the least one of the LDAR components is leaking, and further comprising computer-executable instructions which, when executed by the computer, cause the computer to:
prompt a user to obtain a closer video of the one of the LDAR components that is leaking;
record the closer video of the one of the LDAR components that is leaking; and
store the closer video to the memory located in the computer.

14. The non-transitory computer-readable medium of claim 11, wherein the indication is received automatically from a camera in response to the at least one of the LDAR components within the at least one specified area leaking.

15. The non-transitory computer-readable medium of claim 11, further comprising computer-executable instructions which, when executed by the computer, cause the computer to receive a request to record a closer image of the LDAR components in response to receiving an indication that the at least one of the LDAR components within the at least one specified area is leaking.

16. A non-transitory computer-readable medium having stored thereon computer-executable instructions which, when executed by a computer, cause the computer to:
receive a route of specified areas, wherein each specified area includes one or more Leak Detection and Repair (LDAR) components;
receive one or more images associated with monitoring for a gas or liquid leak in at least one specified area in the route;
display the images on the computer;
display the LDAR components as one or more icons in a Graphical User Interface (GUI) window;
receive an indication based on the displayed images of whether at least one of the LDAR components within the at least one specified area is leaking; and
if the indication indicates that at least one of the LDAR components within the at least one specified area is not leaking, display a message on the computer for a user to proceed to another specified area in the route.

17. A non-transitory computer-readable medium having stored thereon computer-executable instructions which, when executed by a computer, cause the computer to:
receive information pertaining to one or more Leak Detection and Repair (LDAR) components within a specified area, wherein the information corresponds to an information field from a list of information fields;
receive a video from a camera that records the specified area;
superimpose the information onto the video from the camera, while the video is being recorded at the specified area; and
store the video along with the information to a memory located in the computer.

18. The non-transitory computer-readable medium of claim 17, wherein the list of information fields comprises information fields for temperature, date, time, LDAR component types, name of the LDAR components or the specified area, or combinations thereof.

19. The non-transitory computer-readable medium of claim 17, further comprising computer-executable instructions which, when executed by the computer, cause the computer to:
  display the list of information fields; and
  receive the information corresponding to the information field from the list of information fields.

* * * * *